(12) United States Patent
Lebelle et al.

(10) Patent No.: US 9,651,168 B2
(45) Date of Patent: May 16, 2017

(54) IMPLEMENTATION OF A FLUID TRANSPORTATION PIPE WITH FLEXIBLE HOLD

(71) Applicant: Via Marina, Paris (FR)

(72) Inventors: Claude Lebelle, Croissy sur Seine (FR); Francois Thiebaud, Saint Cyr sous Dorman (FR); Benoît Nardari, Aubagne (FR)

(73) Assignee: VIA MARINA, Paris (FR)

( * ) Notice: Subject to any disclaimer, the term of this patent is extended or adjusted under 35 U.S.C. 154(b) by 0 days.

(21) Appl. No.: 14/363,931

(22) PCT Filed: Dec. 6, 2012

(86) PCT No.: PCT/FR2012/052826
§ 371 (c)(1),
(2) Date: Jun. 9, 2014

(87) PCT Pub. No.: WO2013/083927
PCT Pub. Date: Jun. 13, 2013

(65) Prior Publication Data
US 2015/0010360 A1   Jan. 8, 2015

(30) Foreign Application Priority Data

Dec. 7, 2011 (FR) .................................. 11 61294
Oct. 5, 2012 (FR) .................................. 12 59533

(51) Int. Cl.
*F16L 1/14* (2006.01)
*F16L 1/20* (2006.01)
(Continued)

(52) U.S. Cl.
CPC ........ *F16L 1/24* (2013.01); *F16L 1/12* (2013.01); *F16L 1/16* (2013.01); *F16L 1/20* (2013.01);
(Continued)

(58) Field of Classification Search
CPC ....................................................... F16L 11/121
(Continued)

(56) References Cited

U.S. PATENT DOCUMENTS 3,086,369 A * 4/1963 Brown ........................ F16L 1/24
138/111
3,849,997 A * 11/1974 Gower ..................... F16L 1/165
114/293

(Continued)

FOREIGN PATENT DOCUMENTS

FR    1 417 987    11/1965
FR    2 260 051    8/1975
(Continued)

OTHER PUBLICATIONS

Search report dated Aug. 17, 2012 from corresponding French Patent Appln. No. 1161294 (8 pages).
(Continued)

*Primary Examiner* — Tara M. Pinnock
(74) *Attorney, Agent, or Firm* — G. Peter Nichols; Brinks Gilson & Lione

(57) ABSTRACT

The invention relates to the implementation of a fluid transportation pipe. In order to achieve this, the pipe is equipped with a ballasting system, and, along a laying axis, the pipe, thus equipped, is immersed in a fluid having movement, such as the sea. A ballast mass of the ballasting system then substantially causes at least this ballasting system to sink.

13 Claims, 12 Drawing Sheets

(51) Int. Cl.
*F16L 1/24* (2006.01)
*F16L 1/16* (2006.01)
*F16L 1/12* (2006.01)

(52) U.S. Cl.
CPC ............... *F16L 1/202* (2013.01); *F16L 1/203* (2013.01); *Y10T 137/6954* (2015.04)

(58) Field of Classification Search
USPC ............................ 405/158, 166, 168.1, 168.4
See application file for complete search history.

(56) References Cited

U.S. PATENT DOCUMENTS

| 4,062,198 | A | * | 12/1977 | Lamy | F16L 1/165 |
| | | | | | 405/171 |
| 4,063,430 | A | * | 12/1977 | Lamy | 405/171 |
| 4,310,264 | A | * | 1/1982 | Brownlee | F16L 1/14 |
| | | | | | 405/171 |
| 4,687,378 | A | * | 8/1987 | Jegousse | F16L 1/24 |
| | | | | | 405/158 |
| 6,220,788 | B1 | * | 4/2001 | Jewell | 405/172 |
| 6,926,037 | B2 | | 8/2005 | Tan | |
| 7,344,338 | B2 | * | 3/2008 | Willis | F16L 1/028 |
| | | | | | 405/172 |
| 7,640,950 | B2 | | 1/2010 | Tan | |
| 9,033,615 | B2 | * | 5/2015 | Zhang | F16L 1/123 |
| | | | | | 405/172 |
| 2004/0112452 | A1 | | 6/2004 | Tan | |
| 2005/0115622 | A1 | | 6/2005 | Bennett et al. | |

FOREIGN PATENT DOCUMENTS

| FR | 2 786 246 | 5/2000 |
| WO | WO 03/081105 | 10/2003 |
| WO | WO 2008/062081 | 5/2008 |

OTHER PUBLICATIONS

Search report dated Dec. 19, 2012 from corresponding French Patent Appln. No. 1259533 (8 pages).
PCT/FR2012/052825 International Search Report dated Jan. 30, 2013 (6 pages including English translation).
PCT/FR2012/052826 International Search Report dated Jan. 30, 2013 (6 pages including English translation).
XP055035510, Author: Bogliolo, Félix, "Transportation of Fresh Water in Large Quantities and Over Long Distances by Underwater Flexible Pipeline", Feb. 27, 2009, Presentation Paper Semide Mar. 2009, via-marina, pp. 1-4, obtained from internet link <http://www.semide.net/media_server/files/N/7/via-marina_presentation.pdf>.
XP002681859, Produced by: Via Marina, "Via Marina: A High-Performance and Low-Cost Water Transportation System", 2010, web video and screen shot, pp. 1-2, obtained from internet link <http://www.thewaterchannel.tv/media-gallery/2153-via-marina-a-high-performance-and-low-cost-water-transportation-system>.

* cited by examiner

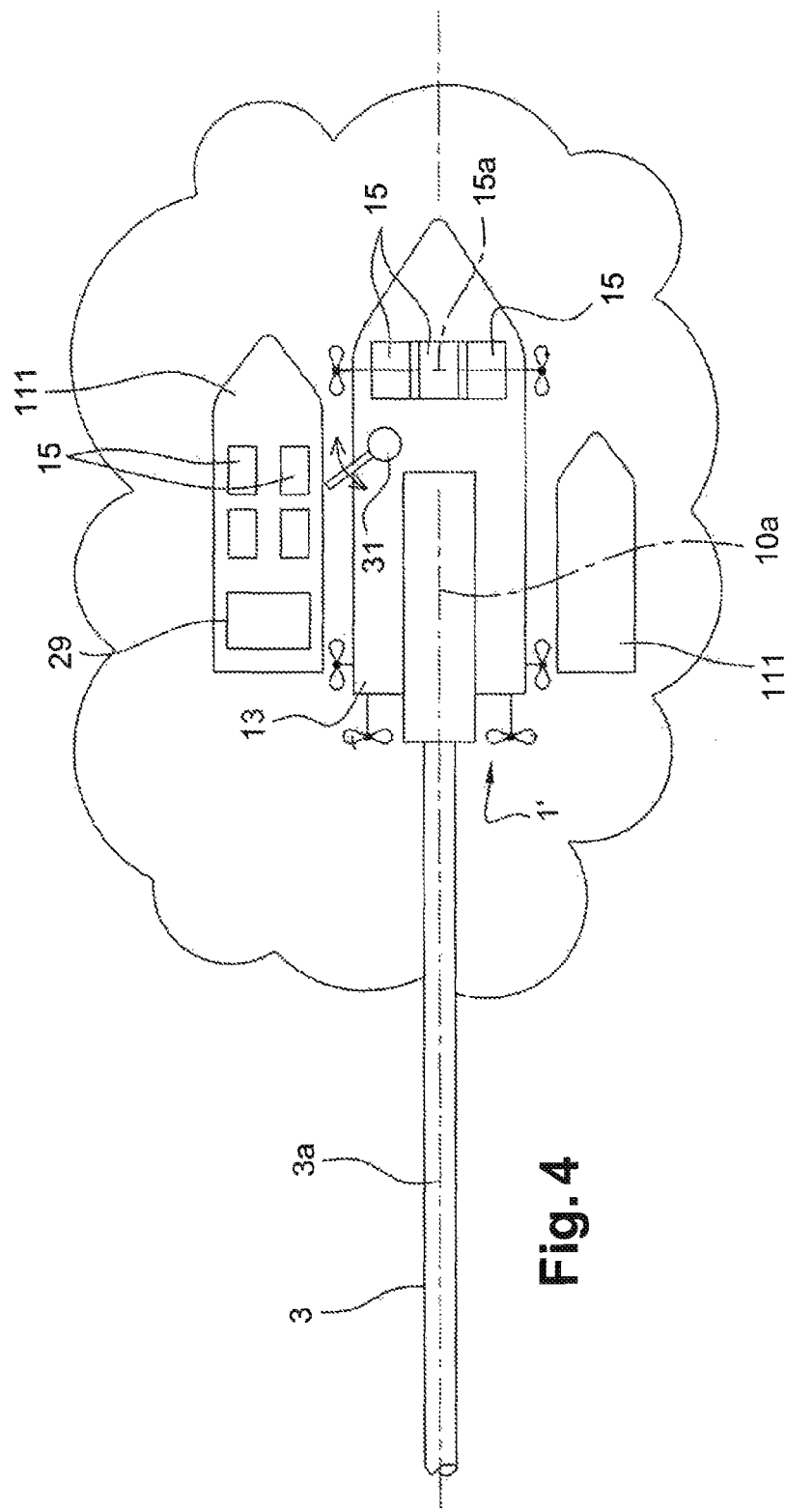

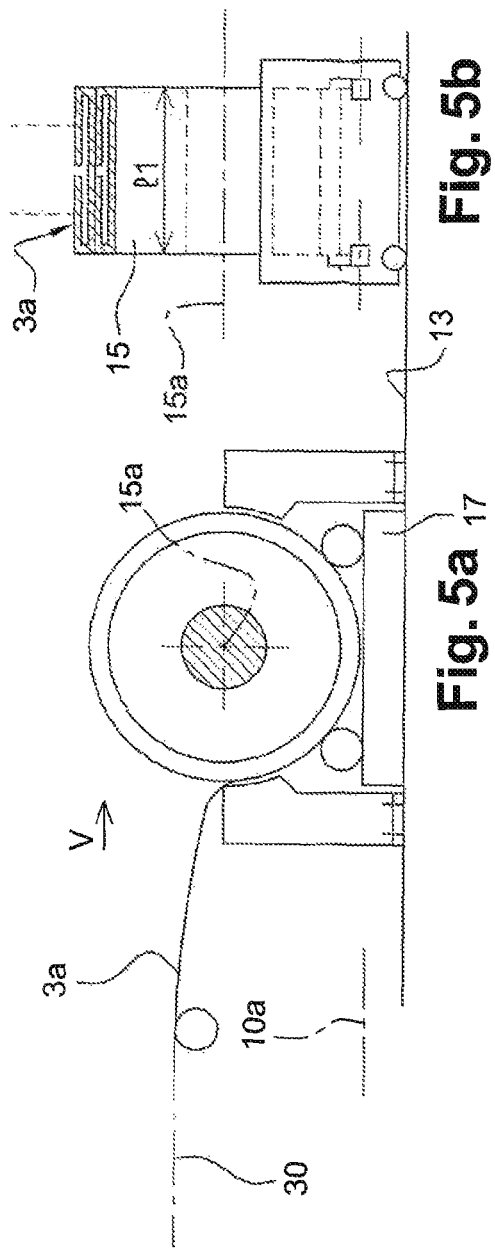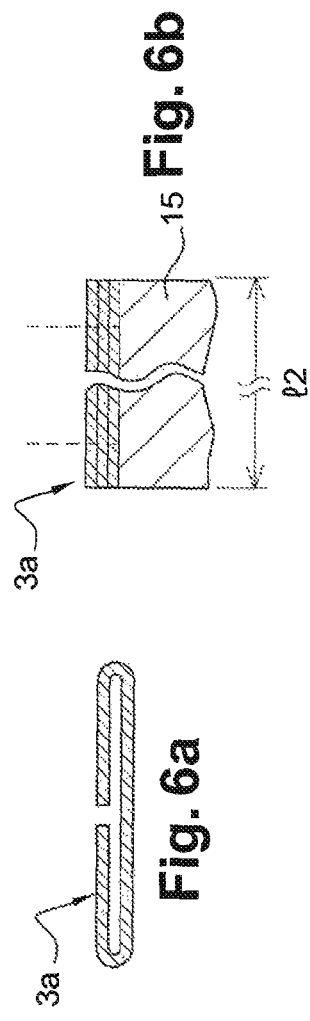

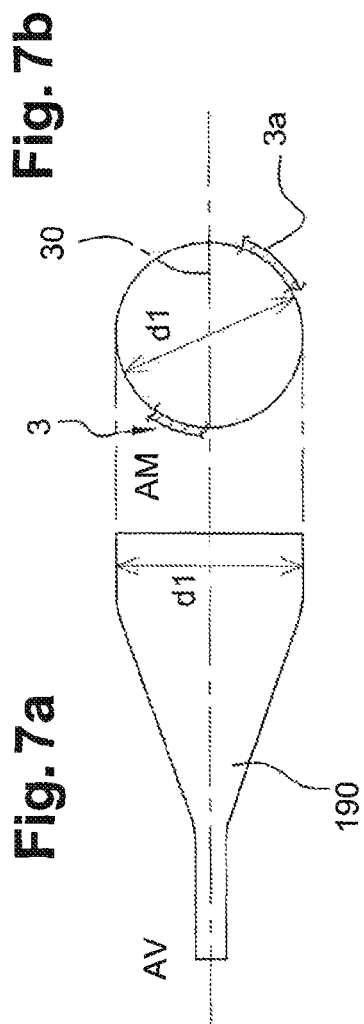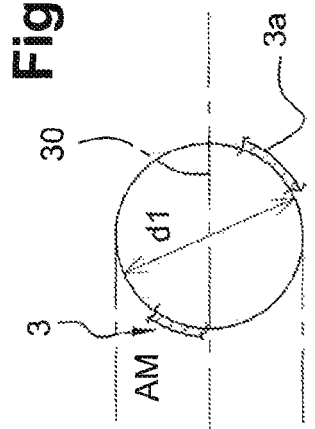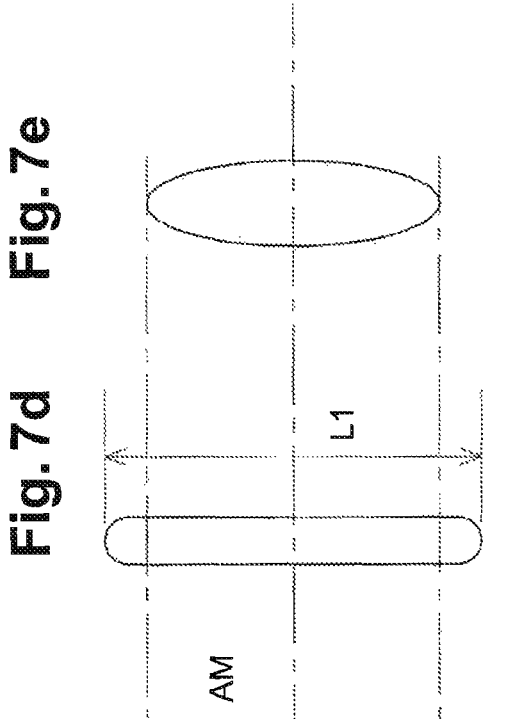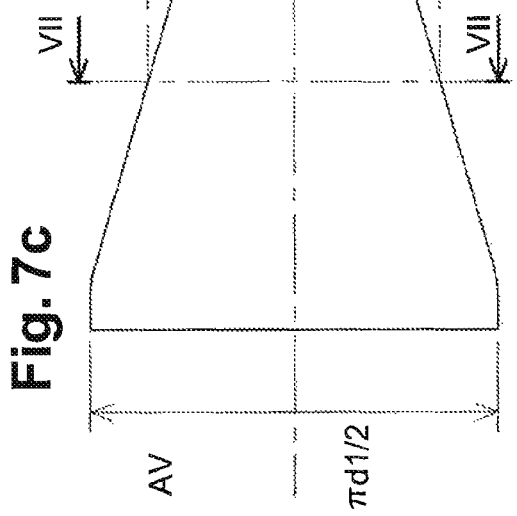

IMPLEMENTATION OF A FLUID TRANSPORTATION PIPE WITH FLEXIBLE HOLD

This application claims priority to International Application No. PCT/FR2012/052826 filed Dec. 6, 2012; French Patent Appln. No. 1161294 filed Dec. 7, 2011; and French Patent Appln. No. 1259533 filed Oct. 5, 2012; the entire contents of each are incorporated herein by reference.

BACKGROUND

The invention relates to the immersed installation of a pipe for transporting liquid, typically fresh water. Specifically, this is notably a method for implementing such a pipe. An assembly between this pipe and a ballasting system for ballasting the pipe is also covered.

SUMMARY

The pipe will typically be used for transporting fresh water over several hundred km (or more).

One problem is how to ensure that:
the pipe will be operational so that it can be laid quickly and functionally, even at sea, and despite the movements of the fluid in which it is laid, such as the movements of the swell and/or of the currents,
and/or there will be no risk of its being damaged while it is being laid or later on, once it has been laid. One proposed solution is that, within the context of this implementation of the pipe:
use is made of a flexible pipe having a longitudinal axis, a cross section that is deformable, and which can be bent on itself longitudinally,
the pipe be provided with a ballasting system,
and that the pipe thus provided be immersed in a moving fluid such as the sea along a laying axis, a ballast weight of the ballasting system then causing at least this ballasting system to act as a sinker.

Such a transport pipe can be installed on a seabed, at a depth which may be of 200 m.

Consistent with the usual definition for underwater piping, a "sinker" here will notably be a means, such as ballast, which in a volume of fluid carries an element connected to this means downward or holds it down.

As far as its "sinking" function is concerned, that will preferably be achieved using one of the following solutions:
by attaching to the pipe a succession of ballasts which are spaced out along the pipe and may lie at regular intervals along the pipe,
by attaching to the pipe a tube that is segmented into hollow compartments filled or to be filled with a ballast,
by attaching to the pipe a hollow continuous tube which, prior to immersion or subsequently, is filled with a weighty material of a density higher than that of the liquid that is to be transported.

Another solution is to provide the pipe with the ballasting system by equipping it in a monoblock manner with a longitudinal, hollow, flexible tube.

It should be noted that, when the pipe is immersed in sea water, this pipe and the fluid circulating therein (typically fresh water) will, together, a priori be lighter than the surrounding salt water (combined relative density <1.03 approximately). They will therefore have a tendency to float. The ballast prevents this.

As far as this pipe is concerned again, it may:
be arranged between a fresh water dispatch point situated on shore and be connected by a riser segment from the submerged laying depth to the shore,
be protected by a landfall structure,
and be connected to the dispatch pump unit situated on shore.

At the other end, the pipe may be connected to the shore by a landfall structure similar in principle to the one described in respect of the first end and connected to a fresh water receiving installation.

This then is the context in which the invention may be situated.

An ancillary problem has to do with how to implement the pipe before immersing it, taking account of the exiguity and conditions of supply in sufficient lengths. For that, the proposal is that prior to or after the step that consists in providing the pipe with the ballasting system, lengths of said empty pipe be assembled end to end on a floating structure and the butt-joined lengths thus provided immersed.

In that case, which encourages prior storage on drums while at the same allowing continuous lay, the recommendation is that:
with the butt-joined lengths provided with the ballasting system the tube be immersed empty or essentially empty, and
with the pipe and tube immersed, a weighty material of density higher than that of the immersion fluid be fed into the tube.

It is recommended in addition that (the assembly weights involved be such), with the pipe filled with the liquid that is to be transported (a priori fresh water) and with the ballasting system carrying the weighty material, this assembly, once immersed in a fluid that has non-steady movements, should tend to rest on the bottom, with the pipe floating or not floating above it. Mechanical safety and stability will be assured.

Furthermore, the problems concerned with the inertia and weight of the ballast at the surface and/or of the pipe and tube assembly will be limited, and it will be possible to alter the respective weights according to their respective positions and according to the loads involved (ballast, pipe, tube, floating structure, currents, swell, etc.).

Another ancillary problem has to do with how to connect the pipe and the ballasting system, in non-monoblock cases. To do that, the proposal is to pass a hoop around the pipe. This combines effectively firm holding and ease of implementation.

Another consideration is, in an immersion fluid in non-steady movement, that of reducing the loads applied to the pipe by the movements of the fluid.

To achieve that, the proposal is to connect the pipe and the ballasting system using a flexible connection that allows the immersed pipe to fluctuate with respect to the ballasting system as a function of the non-steady movements of the immersion fluid, whereas the ballasting system provided with the ballast weight, because of its weight, remains essentially stationary. This may occur prior to immersion or subsequently (notably during immersion).

For ease of placement of the ballast in the ballasting system it is also advisable to ballast the hollow tube by feeding into it a mixture of weighty granular material and of a fluid (a priori liquid) that carries said material.

Further, to make feeding this weighty material in easier it is recommended that this be done from a pipe line through which it will be passed, near to the surface or above the surface, and which will be connected to a floating structure laden with this weighty material. Thus a dredging vessel may be provided which will dredge the material from the seabed in the vicinity of the location in which the pipe is being laid (or a greater distance away, even over one hundred km away if necessary), or for use to be made of the laying ship.

As far as the assembly between the pipe and its ballasting system is concerned it will have been understood that the two will be either monoblock or joined together by means of attachment in which case, this will preferably involve the use of a flexible connection.

In the latter instance, the pipe is free to fluctuate in pace with the varying movements of the fluid (waves, etc.), whereas the ballasting system (now weighted down) remains essentially stationary (or has limited movement) less than a few meters away.

The invention also covers a floating structure provided with the assembly, having at least some of the aforementioned features and which is connected to this structure.

Features and advantages will be set out hereinafter also, with reference to the description of one embodiment illustrated schematically by drawings in which:

BRIEF DESCRIPTION OF THE DRAWINGS

FIG. 4 shows the top of the laying ship and the supply and recovery ships/barges, FIGS. 5a, 5b show a drum and its operational environment, in side view then in front view (arrow v), FIGS. 6a, 6b show two possible ways of placing the relevant length of pipe around the drum, FIGS. 7a, 7b, 7c, 7d, 7e show details of the configuring device (upstream and downstream parts)

DETAILED DESCRIPTION

Figure 1:
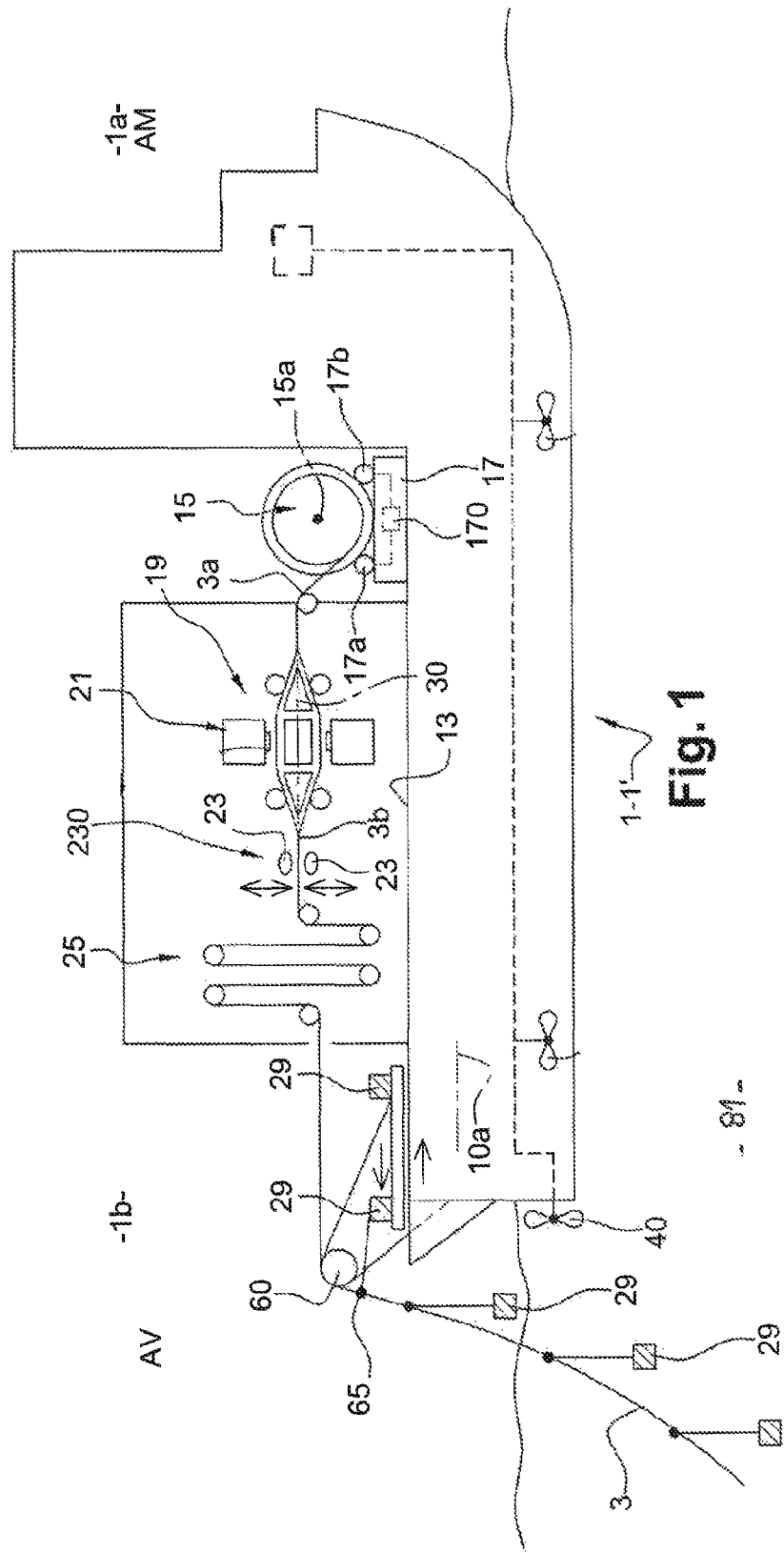
FIG. 1 is a side view of a floating laying structure, in this instance a dynamically positioned ship.

FIG. 1 in particular shows a floating structure 1 comprising a device 10 for laying on a site 11 an elongate hollow pipe 3 for transporting a liquid, which pipe is arranged on a deck 13 of the floating structure 1.

The laying device 10 allows a pipe for transporting liquid, a priori fresh water, to be laid on the seabed (several hundred meters down, a long way offshore, for example between two regions of the world).

The pipe 3 has a longitudinal axis 30. This pipe is flexible and has a cross section that can be deformed between a cross section (such as the internal cross section) that is circular (FIG. 7b, internal diameter d1) and a cross section (such as the internal cross section) that is flattened. For preference, this may be zero. It can also be bent on itself longitudinally, for example into a flattened strip which, at the folds, has a radius of curvature representing less than 10% of the diameter of its circular internal cross section.

In this first example, the laying device 10 comprises:
(at least) one rotary drum 15 about which a first length of pipe 3a is wound in a condition in which its cross section is flattened (see FIGS. 5a, 5b, 6),
a paying-out device 17 with rollers such as 17a, 17b and provided with a motor 170 driving its rotation to pay out the pipe, in this instance the first length 3a,
offering-up means 19 in order to offer up to face one another, with their cross section having a more or less rounded or flattened configuration in common, the first length of pipe 3a coming from the drum 15 and a second length 3b of pipe situated downstream of the first with reference to the direction 30a of laying of the pipe,
assembly means 21 for a watertight connection between the first and second lengths of pipe 3a, 3b in the condition in which their configurations are in common, and for obtaining (as lengths are gradually assembled) the pipe 3,
tensioning means 23 for transmitting to the pipe 3 an axial mechanical tension to advance f1 in the downstream direction (AV) and/or to retreat f2 in the upstream direction (AM),
a winch 25 for amplifying said axial tension (such as f3 in FIG. 1), at least for causing the pipe 3 to advance, downstream of the winch,
and, for preference, means 27 for attaching a ballast (assembly) 29 to the pipe 3.

Thus, the quality of production of this pipe will be promoted and, for laying the pipe at sea, it will be possible to tend toward optimized laying safety, ergonomics and speed.

It is recommended that all these means be staggered from one another along the longitudinal axis 10a of the ship 1', from the bow 1a to the stern 1b and therefore parallel to the longitudinal axis 30 of paying-out of the pipe.

To make the operations of supplying extra lengths of pipe (on drums) on board and of removing empty drums safer and easier, the following is recommended, as shown schematically in FIGS. 1, 3, 4, 9: the drum 15, or each drum, once in an operational condition on the deck 13, will revolve about a horizontal axis such as 15a. This drum, in order to be replaced or brought into position, will be able to move along the deck 13 transversely to the longitudinal axis of the pipe (or to the longitudinal axis 10a of the ship). For preference, a drum hoist 31 will be provided.

In order to limit the space taken up by the drums without impeding the maneuvering of the lengths of pipe, there are two proposed options:

The first (see FIGS. 5b and 6a) is for the drum, such as 15, to have a width $1_1$ oriented at right angles to the longitudinal axis 30 of the pipe, this width representing more than half the external perimeter $n \cdot d\frac{1}{2}$ of the pipe when the cross section of this pipe is in a circular condition (see FIG. 7b). The (relevant length of) pipe is therefore wound around the drum 15, flat not folded over on itself.

It must be appreciated that the pipe could, however, be rather in a condition immediately similar to such a flattened state, i.e. an ovalized condition. For example, the structure of the pipe might make it difficult or even inadvisable to squash the pipe completely flat in this way. In this regard, this pipe may beneficially be made up of a tube continuously braided with synthetic fibers.

The second option (see FIG. 6b) is for the drum to have a width $\frac{1\_2}{}$ oriented as above, but which will then represent less than half the perimeter n·d½. The (relevant length of) pipe in this case will be wound flat (or in said immediately similar condition), folded over on itself, around the drum.

FIGS. 7a to 7e show various possible cross sections the pipe may have depending on the location considered, the change in cross section preferably being continuous.

In order to avoid excessive sliding of the means 190a along the longitudinal axis 10a of the ship that is incompatible with the maximum space allowed on board, downstream 20 and upstream 24 axial end stops are provided. The assembling-together of the lengths 3a, 3b will preferably be a butt joint with one of the ends of the lengths of the pipe overlapping the other over a distance that varies according to the scenario, typically of between 50 cm and 2 m (not shown).

Typically, the assembling means 21 will be able to move transversely to the axis 30 between a position in which the edge-to-edge ends of the lengths of pipe are separated, radially setback one from the other, and an assembling position in which these ends of the lengths 3a, 3b of pipe are radially against or in immediate proximity to one another.

The means of assembly 21 may comprise welding means. The lengths of pipe will preferably be made of a meltable plastic (a priori one reinforced with fibers, filaments or other flexible tube mechanical reinforcing structures) that can be assembled with one another by fusion bonding in a way that is fluid tight in respect of the liquid concerned.

Further downstream on the deck 13 it is also recommended for the winch 25 to be a capstan winch, with several motorized rotary rollers such as 25a, 25b, 25c, each of horizontal axis.

In the example described hereinabove, this is what happens:

Mounting the drum 15 with its length of flexible pipe on the motorized paying-out device 17 allows the pipe to be unwound at the speed required for laying.

Next, the paying-out and advancing of this length of pipe (now flattened) as far as the butt-joining station 190 allow the pipe to be returned to a cylindrical shape on a circular or ovalized base, allowing the aforementioned joining-together of their ends.

At the butt-joining station, the end 3b of the lengths of pipe already butt-jointed one after another and in the process of being laid is immobilized using the offering-up means 19. The end of the extension length 3a is then brought to the butt-joining station and inserted into the offering-up means 19, between the structures 190a and 190b.

The ends of said upstream and downstream lengths are then butted together.

Downstream of this butt-joining station, the downstream part 190a3 of the configuring device 190a present inside the pipe and therefore passing along inside the pipe allows the flexible pipe 3 to be returned to its flattened (or at least flatter) strip shape.

The pipe 3 then enters the tensioning device 230 which, via the tensioning means 23 it comprises and which may comprise caterpillar tracks operated such that they can run along the pipe at variable speed and press against it with variable pressure, will therefore apply an axial tension thereto. This may therefore be performed using friction, and therefore under pressure, between the aforementioned contact means and, in this instance, the exterior and interior walls of the pipe 3.

The tensioning means 23, 230 are advantageously operated by the forward travel of the laying ship so as to cause the flexible pipe to advance toward the rear 1b (downstream) of the laying ship at the same speed as this ship advances via its propulsion engine(s).

Motorized operation, which may if necessary involve a control loop, of the tensioning means 23 allows the flexible pipe to be made to advance or retreat through these tensioning means.

Further downstream, the pipe then passes through the winch 25 where the tension present in the pipe 3 is amplified through the application of a torque to each of the rollers or drums of the winch. The winch, in this instance the rollers 25a, 25b, 25c is (are) operated as a function of the advancing movement of the pipe 3 through the tensioning means 23.

On leaving the winch, the tension present in the pipe 3 is a multiple of the tension imparted by the tensioning means 23. Through the tension they apply to the pipe (applied pressure), the tensioning means 23 operate the winch 25, being a control function of the forward movement of the ship 1' (which is powered).

Figure 2:
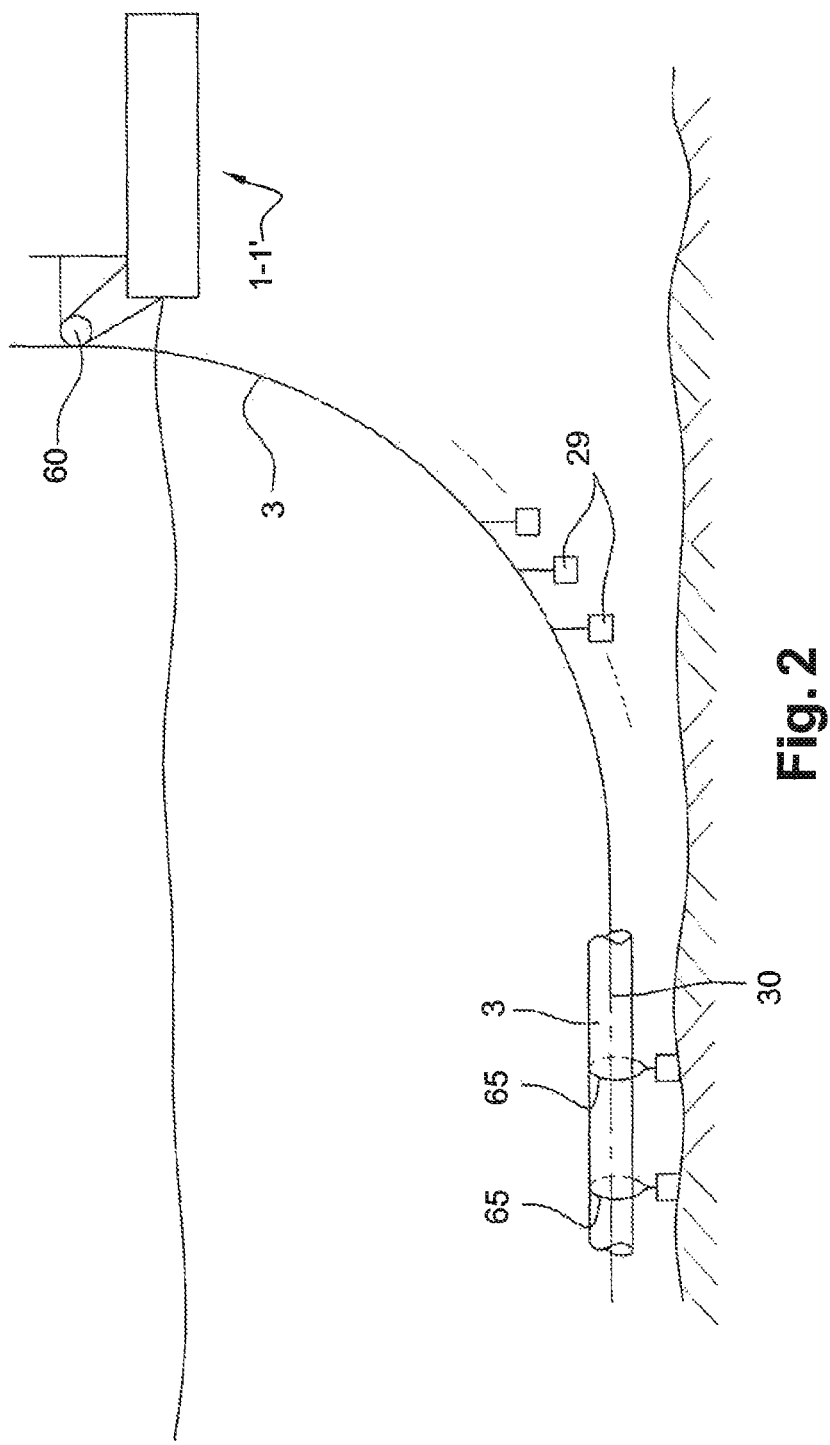
FIG. 2 shows the rear of the ship and the pipe laid on the sea bottom.
Figure 3:
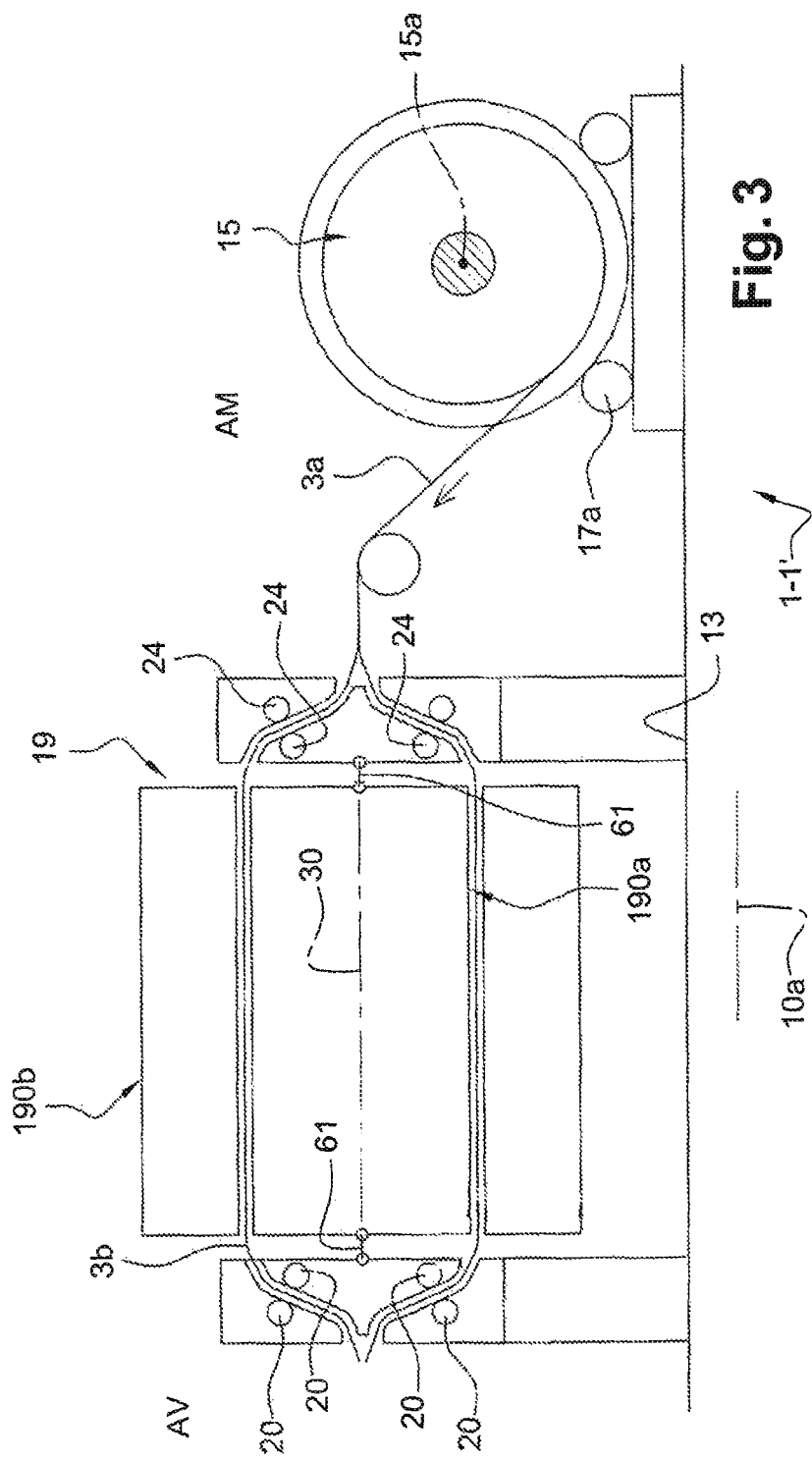
FIG. 3 shows an operational drum and the configuring device, downstream.

The pipe 3 then arrives at the rear roller 60 of the laying vessel against which it rests as it begins its free span between the laying vessel and the seabed 11 (see FIG. 2 especially).

Figure 8:
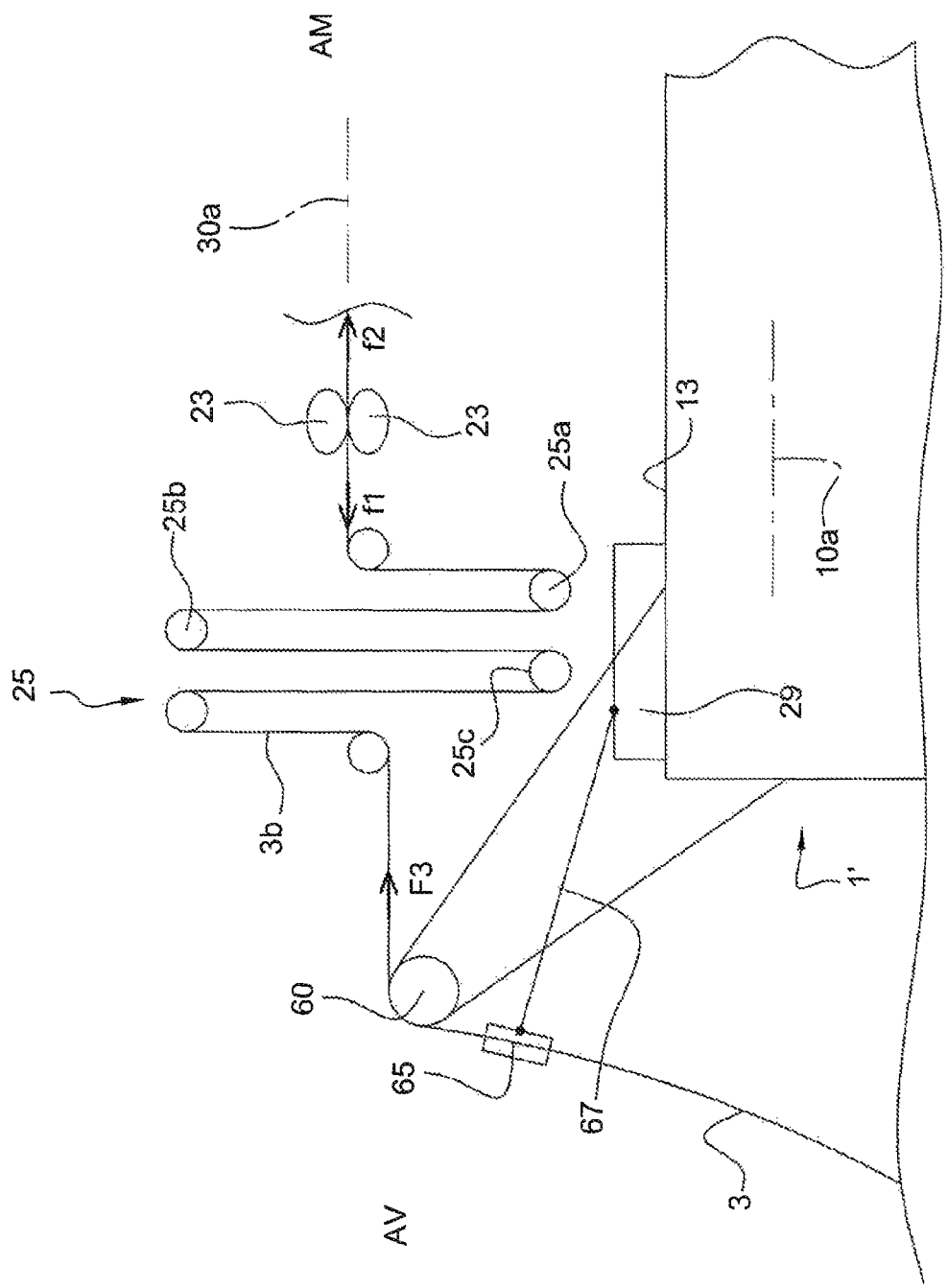
FIG. 8 shows the rear of the deck of the ship: tensioning means, winch, then means for affixing the ballasts and rear roller with axial overhang to begin laying the ballasted pipe.
Figure 9:
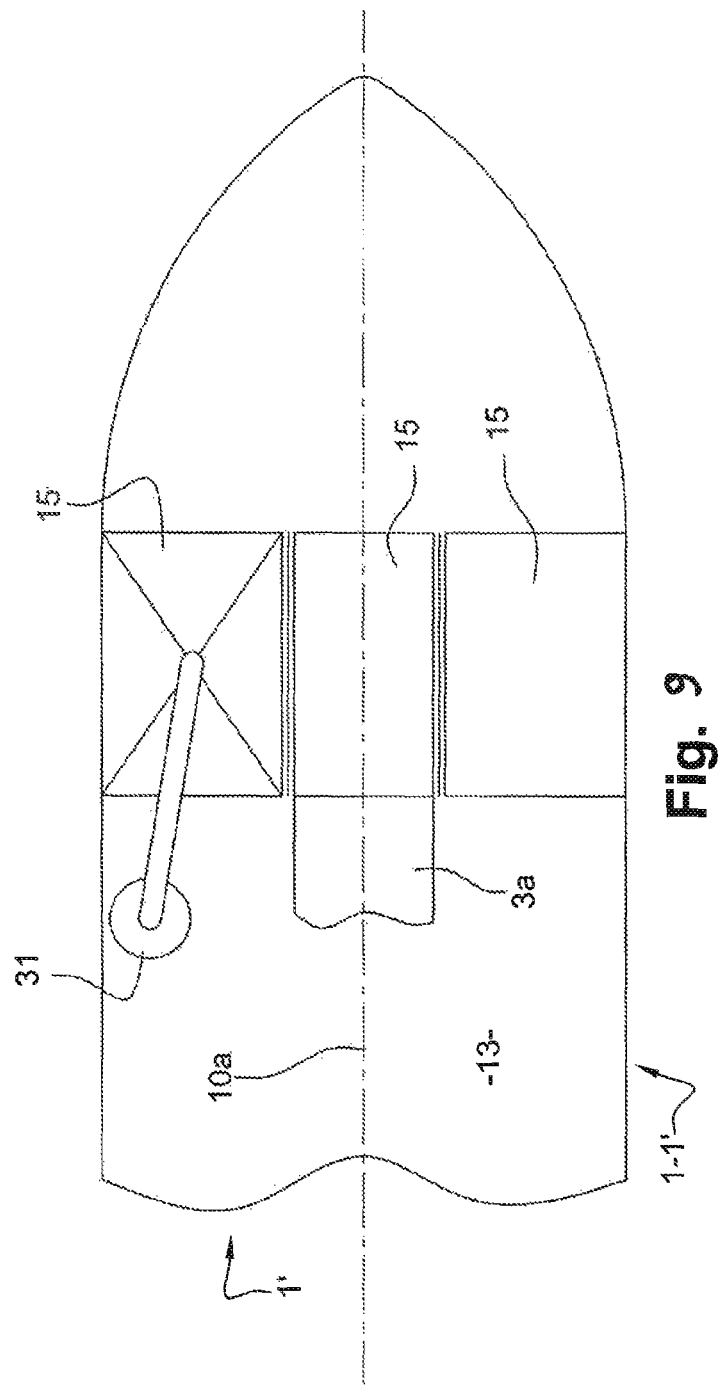
FIG. 9 shows several drums across the deck, such that the one in the middle is operational (is paying out), the one at the top, which is full, is on standby, and the one at the bottom, empty of pipe, is ready to be removed from the laying vessel.

FIGS. 1 and 8 show that in this case, downstream (to the rear) of the rear roller 60, the ballasts 29 are attached to the pipe 3 to complete the preparation of the structure 3, 29 that is to be immersed, and which therefore comprises the flexible pipe 3 and its ballasts.

A priori it is recommended for the ballasts 29 to be attached to the flexible pipe at regular intervals.

The attachment, for each ballast, may then be achieved in the form of a hoop 65 passed around the pipe and from which a weight acting as ballast is suspended by means of a cable 67. Once the hoop has been passed around the pipe, it is tightened to hold it in place. When the ballasting system is attached to the flexible pipe, the assembly is weighty and sinks in seawater. The free span between the bottom and the surface takes the form of a catenary curve, the parameters of which are dependent on the characteristics of the project: the sinking weight of the assembly, the depth of water and the laying tension.

As the laying ship 1' gradually moves forward, the tensioning means and the winch cause the flexible pipe 3 to advance in the downstream direction (toward the rear) of the laying ship and the free span moves, more or less maintaining its balanced form.

A length of structure 3, 29 comes to rest on the bottom, and this length more or less corresponds to the length by which the tensioning means 23 have caused the pipe to advance, at relatively constant tension.

The free span has a length that is determined by the horizontal tension applied at the top of the structure 3, 29.

It must be clear that the ballasting of the pipe 3 could be achieved in a different way from the foregoing, notably by essentially continuous ballasting. For example, the pipe (and the upstream extension lengths 3a thereof) may be provided with a tube, for example a longitudinal tube, segmented into compartments, hollow and filled or to be filled with a weighty material (of a density higher than that of the fresh water being transported) and that may be interrupted (in a fluidtight manner) near each butt-jointing free end, at the place where the assembly means such as 21, 22 are to operate. The longitudinal tube, segmented into compartments, may be monoblock with the pipe and made of a flexible permeable material comparable to that of this pipe so as to be bendable and strong like it is. For operational reasons and reasons of efficiency (notably of speed) of laying, the use of ballasting, discrete or otherwise, but not monoblock with the pipe is nevertheless recommended, with the ballast attached to the elongate pipe downstream of the tensioning means and of the winch.

It is also possible to plan for the ballast to be laid partly with the pipe and partly after the pipe has been laid.

Figure 10:
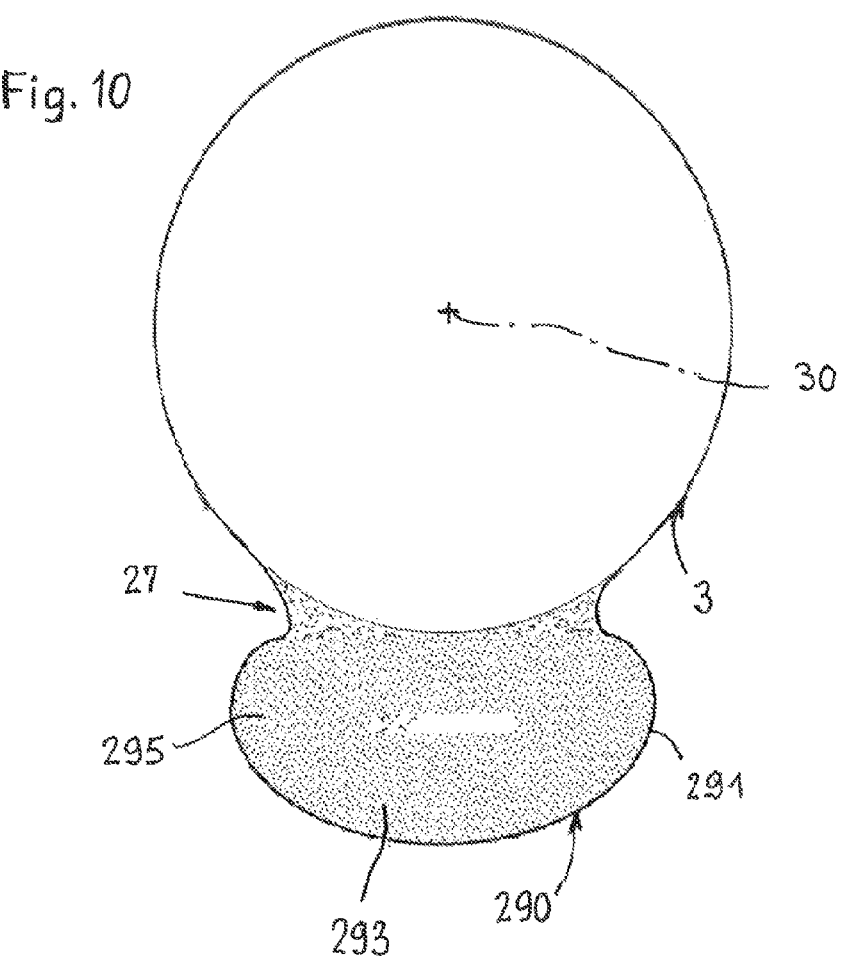
FIGS. 10, 11 show a monoblock pipe with its ballasting system in cross section and in side view respectively.

FIG. 10 illustrates the pipe 3 of the type already introduced, provided with a ballasting system 290 that is monoblock with it.

The ballasting system 290 comprises (at least) one tube defined by a membrane 291 which connects to that of the pipe to form a pocket 293 in which to place a weighty ballasting material 295.

Figure 11:
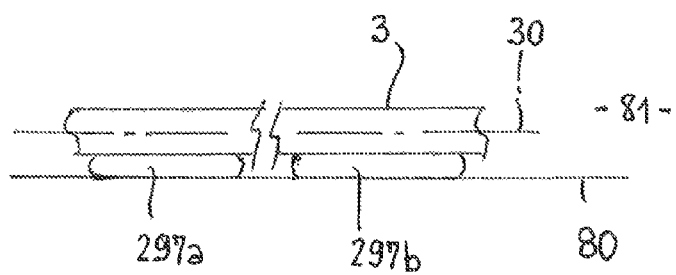

For preference, the tube, which is hollow and flexible, will extend longitudinally, running parallel to the axis 30; it may be segmented into compartments such as 297*a*, 297*b* in FIG. 11.

A weighty ballasting material 295 will be placed in the (each) pocket 293.

Figure 13:
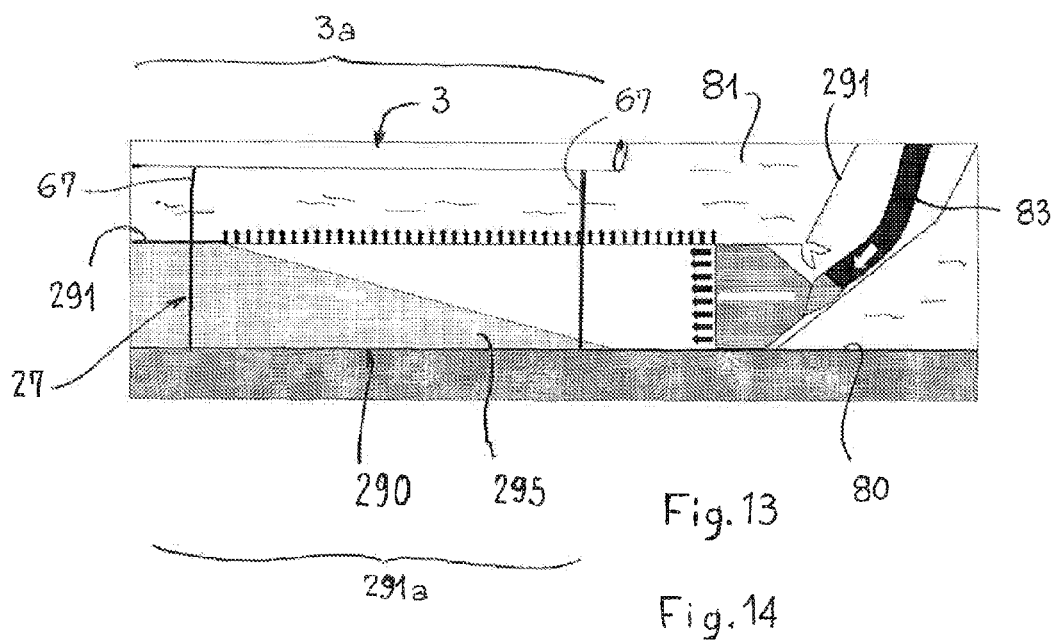
FIGS. 13, 14 show two possible solutions for feeding in the ballast in the bottom of the immersion zone, for example in the context of the solution of FIG. 1.
Figure 14:
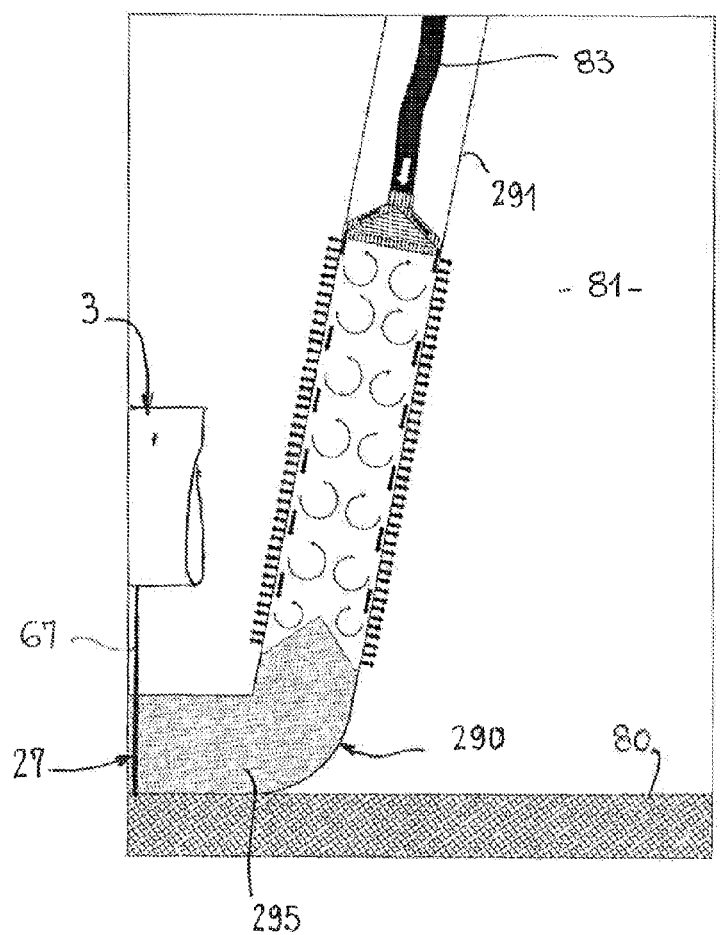

It must be understood that just as the pipe 3 can be ballasted before it is immersed (as in FIGS. 1, 10) by combining the ballasting system and the ballast weight(s) (also referred to as weighty mass(es)), so it may prove preferable to add the ballast later, particularly:

once the pipe 3 and (the length facing it of) the ballasting system (hitherto empty or essentially empty) 290 have reached the immediate vicinity of the bottom 80 above which the laying fluid 81 extends (a few meters to a few tens of meters from the bottom) as in FIG. 14, or once the length (such as 291*a*) of the tube that faces the corresponding length (such as 3*a*) of pipe is already lying more or less along the bottom 80, as in FIG. 13.

It must be understood that, in these last two instances, a single longitudinal tube or a limited number of very elongate tubes (each several hundred to several thousand meters long) will be chosen.

And then, for preference:

with the lengths of pipe 3 already butted together and provided with (monoblock or otherwise) the ballasting system, the tube will be immersed empty or essentially empty and, with the pipe and tube 290 immersed, a material of a density higher than that of the fluid 81 will be fed into the tube.

Figure 12:
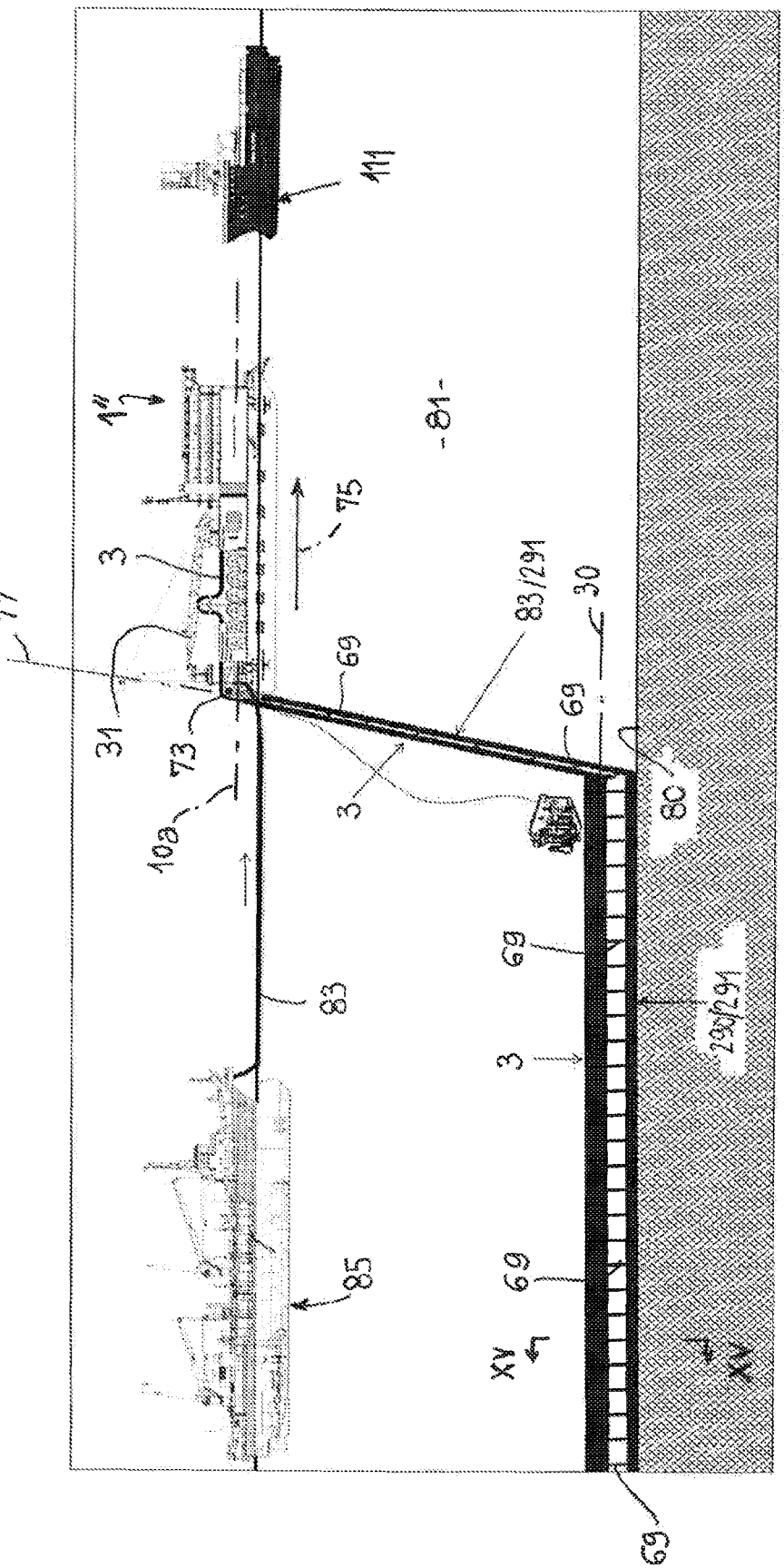
FIG. 12 shows an alternative form of FIG. 1, in terms of laying solution.

FIGS. 12 and 13, 14 the longitudinal tube 291, a priori a single one (or one therefore made up of a limited number of very elongate tube elements) is, once immersed, filled with a mixture of granular material (sand, gravel, etc.) and water, via a pipe line 83. It is recommended that the wall 291 of the tube be permeable to water but essentially impervious to the granular material.

Even when immersed in seawater, the weighty material fed in will have a density higher than that of the fluid in which this immersion takes place (notably seawater).

With reference to FIG. 12, it is recommended for the pipe line 83 that supplies the granular ballasting material 295 to be connected to a floating structure 85 (such as a dredging vessel) laden with granular material (and perhaps even with water). From the floating structure 85, the pipe line 83 passes very close to the surface or above the surface, before being immersed, into the tubular tube 291, in parallel with the pipe, after (a priori on the floating structure 1') this pipe has been provided with its ballasting system 290. It will be recalled that, at that moment, this ballasting system may or may not cause the pipe/ballasting system assembly to act as a sinker, because the ballast weight itself is not necessarily yet present. By contrast, the ballasting system has already been attached to the pipe, preferably downstream of the joining-together of the lengths of pipe.

In this FIG. 12 it may also be seen that the transport ships such as 111 can supply the laying ship 1' continuously with lengths of flexible pipe and with tubes, it being possible for these stores to be transferred on board the laying ship using the on-board hoist. Notably in FIGS. 2, 12-15 it can now be seen that there has been a desire to illustrate that, in an immersion fluid 81 that is in non-steady motion and in order to reduce the loadings therefore applied to the ballasting system provided with its ballast by the movements of the fluid over the pipe, it is recommended that the lengths be provided with a ballasting system that comprises the passing of a hoop 65 around the pipe and/or with a cable such as 67, preferably a flexible one, or alternatively with a flexible strapping solution 69.

Figure 15:
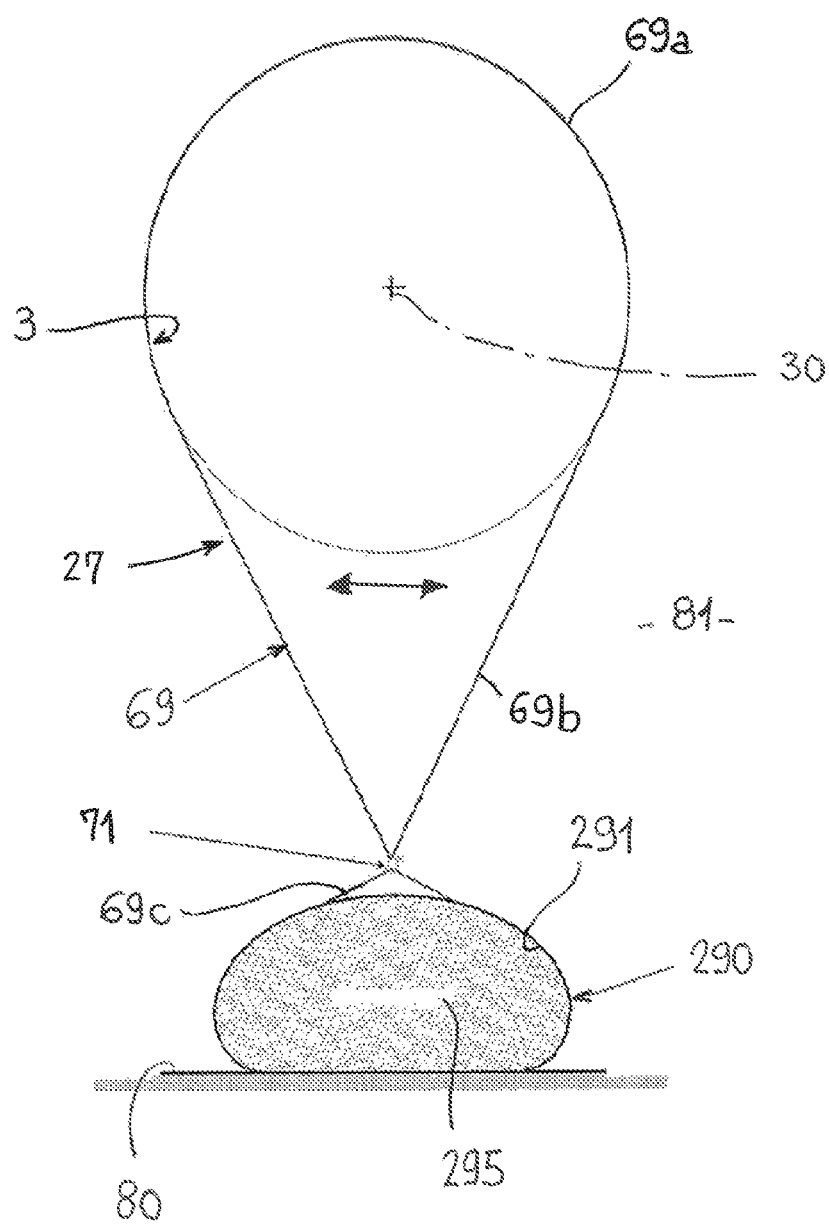
FIG. 15 shows, in a cross section transverse to the longitudinal axis (section on XV-XV), a flexible connection, which absorbs load, between a pipe and its ballasting system positioned off to the side.

In so doing attempts are thus being made to encourage the means of attachment of the ballasting system to the pipe 3 to comprise a connection that may be qualified as flexible insofar as it will allow the immersed pipe to fluctuate with respect to the ballasting system 290 as a function of non-steady movements of the immersion fluid, whereas the mass of the ballasting system provided with its ballast (such as 295) then holds this system essentially stationary on the bottom 80 (see double headed arrow in FIG. 15).

At least the (ballasted) ballasting system will then act as a sinker. With its fluid to be transported inside it (such as fresh water), the pipe 3 made do so likewise.

In FIG. 15, the flexible connection, here provided for example in the form of the flexible strap 69*b* interposed between the pipe 3 and the ballasting system 290/291 (which in this instance is hollow) provided with its (in this instance internal) ballast weight 295, makes it possible, for example at sea and within set limits, for the pipe to move or fluctuate freely in pace with the movements of the water whereas the ballasting system 290/291/295 remains (essentially) stationary. This system is not rigidly attached to the pipe. If drag forces become predominant, the difference in speed between the seawater and the pipe is small, and likewise the drag forces. If forces of inertia become predominant, the difference in acceleration between the seawater and the pipe is small, as likewise are the inertia forces. There is therefore no need to specify the ballasted system so that it can withstand the drag and inertia forces that the swell could generate on a pipe line that is fixed or rigidly attached to its ballasted system that could also be referred to as its "stabilizing device".

As shown in FIG. 15, the flexible strap 69*b* may continue at 69*a* around the pipe 3 for connection thereto and at 69*c* around the longitudinal tube 291, likewise for connecting that in. On the intermediate strap 69*b* one or more nodes 71 make it possible to create an almost spot zone about which the desired rocking effect or effect of following the movement of the water 81 takes place, essentially transversely to the axis 30.

The solution of FIGS. 10, 11 does not permit that.*

In FIG. 15, the solution illustrated, which corresponds to the scenario of FIGS. 12-14 in particular, makes it possible to avoid applying to the pipe at the moment of immersing it the axial tensions that are imposed by the solution of FIG. 1 and applied by the tensioning means 23 and the winch 25. Admittedly, it is preferable for the pipe 3 to be immersed via the stern roller 73 of the ship 1" to be substantially taut in the axial direction, but it is above all the mass of the elongate strip formed by the part of pipe 3 already on the bottom and subjected to the ballast(s) that is already submerged that causes the next part of the assembly 3/290 (which in this instance is not ballasted as it sinks) to sink down toward the bottom 80 at an inclined angle 77 (see figure), this being achieved in conjunction with the forward travel of the ship 1" such that its longitudinal axis 10a, that 30 of the ballasted pipe on the bottom and the direction of forward travel 75 are substantially parallel, the ballasted pipe being paid out and laid on the bottom behind the ship 1".

As far as this laying of the pipe on the bottom is concerned, it will be noted that, when empty, it might float above its ballast, but with fresh water circulating through it, it ought a priori to rest on the bottom, although this does not in any way remove the benefit of the "flexible connection" like that 69 of FIG. 15.

The pipes 3 may measure up to more than 4 meters in diameter and are laid approximately 2-10 meters, for example 4 meters, from the bottom. The cross section of each ballasting system may measure 1-5 meters, in the round state, for example 2 meters.

The invention claimed is:

1. A method for immersing a pipe from a moving ship having a longitudinal axis, where the pipe is flexible, has a longitudinal axis, transports liquid, has a cross section that can be deformed between a circular cross section and a flattened cross section and is bendable on itself longitudinally, the method comprising:
   providing, from the ship, the pipe with a ballasting system by equipping it with at least one longitudinal, hollow, flexible tube,
   immersing the provided pipe in a moving fluid along a laying axis,
   placing a ballast weight in the at least one tube to cause the ballasting system to act substantially as a sinker,
   wherein a mass of an elongate strip formed by a first part of the pipe and of the tube weighted down by the ballast weight, already immersed on a bottom of the immersion fluid, ensures that a following part of an unballasted pipe descends towards the bottom during at least part of the immersion, at a sloping angle, in conjunction with the forward movement of the ship such that a longitudinal axis of the ship and that of a ballasted pipe on the bottom are substantially parallel, the ballasted pipe thus being laid on the bottom, behind the ship, the pipe being provided with the ballasting system, itself provided with the ballast weight, by connecting the pipe and the ballasting system using a flexible connection that allows the immersed pipe to fluctuate with respect to the ballasting system as a function of non-steady movements of the immersion fluid, and wherein the ballasting system provided with the ballast weight remains essentially stationary.

2. The method of claim 1 in which, before or after the step of providing the pipe with the ballasting system, lengths of empty pipe comprising at least one continuous or segmented hollow longitudinal tube, connected to the pipe, are assembled end to end on a floating structure, to form butt-joined lengths that are immersed.

3. The method of claim 2, in which:
   with the butt-joined lengths provided with the ballasting system, the at least one tube is immersed empty or essentially empty, and
   with the pipe and tube immersed, a weighty material of a density higher than that of the immersion fluid is fed into the tube to act as ballast.

4. The method of claim 3 in which the weighty material is fed from a pipe line where it is conveyed, close to the surface or above the surface and which is connected to a floating structure laden with weighty material.

5. The method of claim 2 in which:
   with the butt-joined lengths provided with the ballasting system, the at least one tube is immersed empty or essentially empty, and
   with the pipe and tube immersed, a weighty material of a density higher than that of the immersion fluid, by way of ballast weight, is fed into said at least one tube.

6. The method of claim 1 in which, in order to equip the pipe, said at least one tube is attached to the pipe, wherein the at least one tube is segmented into hollow compartments filled or to be filled with ballast.

7. The method of claim 1 in which, in order to equip the pipe, the at least one hollow tube is attached to the pipe, wherein the hollow tube is continuous and which prior to or subsequently to immersion is filled with a weighty material of a density higher than that of the immersion fluid to act as ballast.

8. The method of claim 7, in which the transport pipe is configured to transport fresh water and the weighty material has a density higher than that of the immersion fluid.

9. The method of claim 1 wherein the providing the ballasting system comprises passing a hoop around the pipe.

10. An assembly comprising:
    a pipe for transporting liquid to be immersed in a moving fluid, the pipe having a longitudinal axis and being flexible, able to deform between an internal cross section that is circular and an internal cross section that is flattened, and bendable on itself longitudinally,
    a ballasting system including a ballast weight or designed to be provided therewith, wherein the pipe and the ballasting system are not monoblock,
    at least one flexible connection comprising an intermediate strap to attach the pipe and the ballasting system to one another and to define a separation between the pipe and the ballasting system and to define one or more nodes that make it possible, with the pipe immersed, to create an almost spot zone about which the pipe can fluctuate with respect to the ballasting system due to non-steady movements of the immersion fluid, wherein the ballasting system provided with the ballast weight then remains essentially stationary, and
    a longitudinal tube that is longitudinally continuous or segmented into hollow longitudinal compartments that are filled or to be filled with a mixture of weighty granular material of a density higher than that of an immersion fluid and of a fluid for carrying said material in order to feed it in.

11. The assembly of claim 10 in which, with the pipe immersed in seawater and filled with fresh water and with the ballasting system carrying a weighty material of a density higher than that of the seawater, the assembly immersed in a fluid with non-steady movements has a tendency to rest on the bottom.

12. The assembly of claim 10, further comprising several flexible straps with each one comprising said intermediate strap and being passed around the pipe and the ballasting system.

13. A floating structure provided with the assembly as claimed in claim 10, connected to it.

\* \* \* \* \*